(12) United States Patent
Chen et al.

(10) Patent No.: US 9,217,509 B2
(45) Date of Patent: Dec. 22, 2015

(54) RECIPROCATING PISTON LEAN METHANE GENERATOR

(75) Inventors: Yiliang Chen, Dongying (CN);
Guochange Zhang, Dongying (CN);
Qinshui Bai, Dongying (CN);
Xiaozhong Ma, Dongying (CN);
Tingyong Qin, Dongying (CN); Jiajun Sun, Dongying (CN)

(73) Assignee: Shengli Oilfield Shengli Power Machinery Co., Ltd., Dongying (CN)

( * ) Notice: Subject to any disclaimer, the term of this patent is extended or adjusted under 35 U.S.C. 154(b) by 1150 days.

(21) Appl. No.: 13/062,421

(22) PCT Filed: Sep. 5, 2009

(86) PCT No.: PCT/CN2009/073770
§ 371 (c)(1),
(2), (4) Date: Sep. 21, 2011

(87) PCT Pub. No.: WO2010/025688
PCT Pub. Date: Mar. 11, 2010

(65) Prior Publication Data
US 2012/0017872 A1 Jan. 26, 2012

(30) Foreign Application Priority Data

Sep. 7, 2008 (CN) .......................... 2008 1 0139800

(51) Int. Cl.
*F16K 1/22* (2006.01)
*F02D 29/06* (2006.01)
(Continued)

(52) U.S. Cl.
CPC ................. *F16K 1/221* (2013.01); *F02D 29/06* (2013.01); *F02M 21/0209* (2013.01); *F02M 21/0227* (2013.01); *F02M 21/0239* (2013.01); *F16K 31/041* (2013.01); *Y02T 10/32* (2013.01)

(58) Field of Classification Search
CPC ............. F02B 29/083; F02M 21/0227; F02M 21/0209; F02M 21/0239; F16K 1/221; F16K 31/041; F02D 29/06; Y02T 10/32
USPC ......................................................... 123/403
See application file for complete search history.

(56) References Cited

U.S. PATENT DOCUMENTS 2,735,506 A * 2/1956 Glasgow ......................... 96/181
2,764,532 A * 9/1956 Rauh ............................... 95/158
(Continued)

*Primary Examiner* — Hieu T Vo
*Assistant Examiner* — Sherman Manley
(74) *Attorney, Agent, or Firm* — Merchant & Gould P.C.

(57) ABSTRACT

A reciprocating piston generator assembly that uses a low-concentration methane as a form of fuel comprises: a lean methane engine; a generator assembly; a fine water mist transmission system; a refrigerating dehydrator; an electric butterfly valve; a pressure regulator; a fuel-air mixer; a TEM controller; a heat load sensor; a combustion chamber for the lean methane engine; an air filter; and a speed governing butterfly valve, wherein the fine water mist transmission system is attached sequentially with the refrigerating dehydrator, electric butterfly valve and low-concentration methane engine; and the pressure regulator, fuel-air mixer, air filter, speed governing butterfly valve, heat load sensors and combustion chambers are installed in the methane engine; that the TEM controller is connected to the fuel-air mixer and heat load sensor; and the generator is connected to the low-concentration methane engine. This invention has been applied broadly in low-concentration methane coal mines and other similar fields due to its favored properties; such as high heat-recovery efficiency, lessened water consumption, energy savings, emission reduction and environmental protection.

2 Claims, 4 Drawing Sheets

(51) Int. Cl.
*F02M 21/02* (2006.01)
*F16K 31/04* (2006.01)

(56) References Cited

U.S. PATENT DOCUMENTS

| | | | | |
|---|---|---|---|---|
| 2,887,850 A * | 5/1959 | Adams | | 62/625 |
| 3,255,573 A * | 6/1966 | Cox, Jr. | | 95/194 |
| 3,609,942 A * | 10/1971 | Alleman | | 95/192 |
| 3,640,580 A * | 2/1972 | White | | 299/31 |
| 4,068,802 A * | 1/1978 | Goings | | 239/419.5 |
| 4,351,567 A * | 9/1982 | Gillingham | | 299/45 |
| 5,485,728 A * | 1/1996 | Dickinson | | 60/648 |
| 5,648,048 A * | 7/1997 | Kuroda et al. | | 422/168 |
| 5,683,476 A * | 11/1997 | Divers | | 96/273 |
| 6,176,224 B1 * | 1/2001 | Wu et al. | | 123/527 |
| 6,578,559 B2 * | 6/2003 | Kilmer | | 123/527 |
| 6,962,199 B1 * | 11/2005 | Tjeenk Willink | | 166/265 |
| 7,022,153 B2 * | 4/2006 | McKenzie | | 55/423 |
| 7,134,494 B2 * | 11/2006 | Zupanick et al. | | 166/267 |
| 7,143,572 B2 * | 12/2006 | Ooka et al. | | 60/39.182 |
| 7,587,999 B2 * | 9/2009 | Ito et al. | | 123/3 |
| 7,801,668 B2 * | 9/2010 | Ito et al. | | 701/108 |
| 2004/0154272 A1 * | 8/2004 | McKenzie | | 55/423 |
| 2008/0112861 A1 * | 5/2008 | Fisk et al. | | 422/198 |
| 2008/0127950 A1 * | 6/2008 | Malm | | 123/527 |
| 2008/0147303 A1 * | 6/2008 | Ito et al. | | 701/111 |
| 2008/0162335 A1 * | 7/2008 | Ito et al. | | 705/37 |
| 2013/0067913 A1 * | 3/2013 | Nishio et al. | | 60/599 |

* cited by examiner

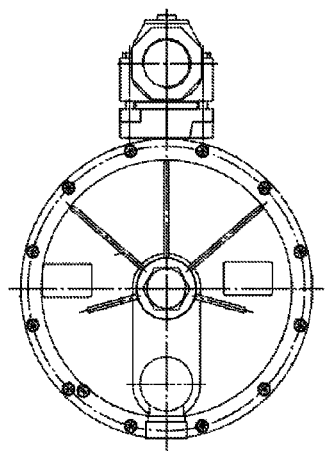
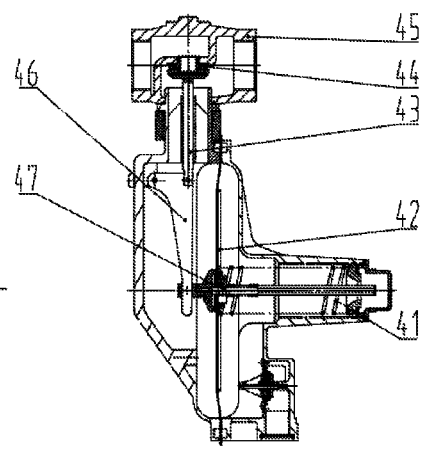
Figure 3　　　　Figure 4
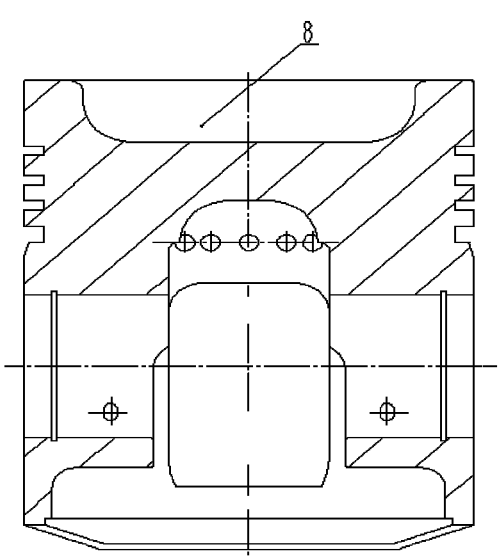
Figure 5

RECIPROCATING PISTON LEAN METHANE GENERATOR

This application is a National Stage Application of PCT/CN2009/073770, filed 5 Sep. 2009, which claims benefit of Serial No. 200810139800.6, filed 7 Sep. 2008 in China and which applications are incorporated herein by reference. To the extent appropriate, a claim of priority is made to each of the above disclosed applications.

FIELD OF TECHNOLOGY

The present disclosure relates generally to internal combustion engines, and particularly to reciprocating piston engine generator assembly using low-concentration methane as fuel.

BACKGROUND

Current internal combustion engine is constructed to burn liquid fuels, such as diesel or gasoline but not coal-mine methane. Coal-mine methane is basically a mixture of methane ($CH_4$) and air. The drained methane from underground coalmines is at concentrations ranging from 6% to 80%, and is generally called "methane". Methane is distinguished as "High-Concentration Methane (HCM)", when the methane concentration is above or equal to 30%; or as "Low-Concentration Methane (LCM)", when its concentration is less than 30%. At present, applicable technologies for HCM are available, where it is utilized to generate electricity or to supply residential households, however, effective technology for application of LCM has not yet been established. Currently, LCM is not utilized and instead is released directly into the atmosphere, resulting in environmental pollution and energy waste.

SUMMARY

The purpose of the invention is to provide a kind of reciprocating piston engine generator assembly using low-concentration methane as fuel, wherein the low-concentration methane supply system acts as a substitute to the conventional fuel supply system used for internal combustion engines, and a basin-shaped combustion chamber is adopted. This technological solution overcomes the deficiencies and shortcomings of the existing technology as mentioned above, and also enables the utilization of low-concentration coal-mine methane in an efficient way.

The reciprocating piston generator assembly is comprised of an engine burning low-concentration methane, an generator, a fine water mist transmission system, a refrigerating dehydrator, an electric butterfly valve, pressure regulators, a fuel-air mixer, a TEM controller, heat load sensors, combustion chambers, air filters, and speed governing butterfly valves, wherein the said fine water mist transmission system is attached in sequence to the refrigerating dehydrator, electric butterfly valve and engine. The pressure regulator, fuel-air mixer, air filter, speed governing butterfly valve, heat load sensor and combustion chambers are installed in the low methane concentration gas engine. The TEM controller is connected to the fuel-air mixer, and heat load sensor and the generator are connected to the low methane concentration gas engine.

In one example, the combustion chamber applied in said methane engine is constructed with a basin shaped structure. The fuel-air mixer mounted on the engine is connected to the speed governing butterfly valve, air filter and pressure regulator. Such speed regulating butterfly valve is connected to the combustion chambers of the engine. The said pressure regulator herein comprising a valve body, a valve seat, an air valve fixed on the valve seat, a pressure regulating level at the top end of the valve seat, a regulating shaft that is jointed vertically in horizontal direction to the pressure regulating level, a diaphragm and pressure regulating springs. The said fuel-air mixer includes a housing body. An air inlet and a fuel inlet are arranged on one side of body. Both inlets are mounted with sensors. In the air inlet there is an air butterfly disc, which is connected with the air stepping motor; and a methane butterfly disc is available in the methane inlet, which is connected with a stepping motor of low-concentration methane. The electric butterfly valve herein comprising a butterfly body and a built-in butterfly disc. This disc is attached to the driving shaft, where the cut-off handle and spring are mounted. On the top end of the valve body, the thrust pin and plug-in electromagnet and tension spring are arranged in such order. The thrust pin is installed horizontally to the driving shaft and perpendicularly to the plug pin. The plug pin is connected to one side of the electromagnet and the tension spring is connected to the other side of the electromagnet. The fine water mist transmission system comprising a water-sealing flame arrestor, a dry type flame arrestor for methane pipeline, a wet-type release valve, a low-concentration methane transmission valve, a water mist control valve, high-pressure resistance water mist producers, high-pressure water transmission pipelines, water mist circulation pump, a dehydrator, a water draining valve and a terminal dry-type coalmine methane flame arrestor, which are mounted in such sequence after the vacuum pump.

Aspects of the invention provide the following advantages in comparison to the existing technology:

1) High energy efficiency.
2) Utilizing the low-concentration methane from coalmine, reducing the Green House Gas (GHG) emission and saving the coal for generating electricity.
3) Less investment amount per unit power output.
4) Less land usage per unit power output.

BRIEF EXPLANATION OF THE DRAWINGS

FIG. 3. The schematic diagram of the structure of the pressure regulator.

FIG. 4. The side view of the structure shown in FIG. 3.

FIG. 5. The schematic diagram of structure of the combustion chamber.

DETAILED DESCRIPTION

Figure 1:
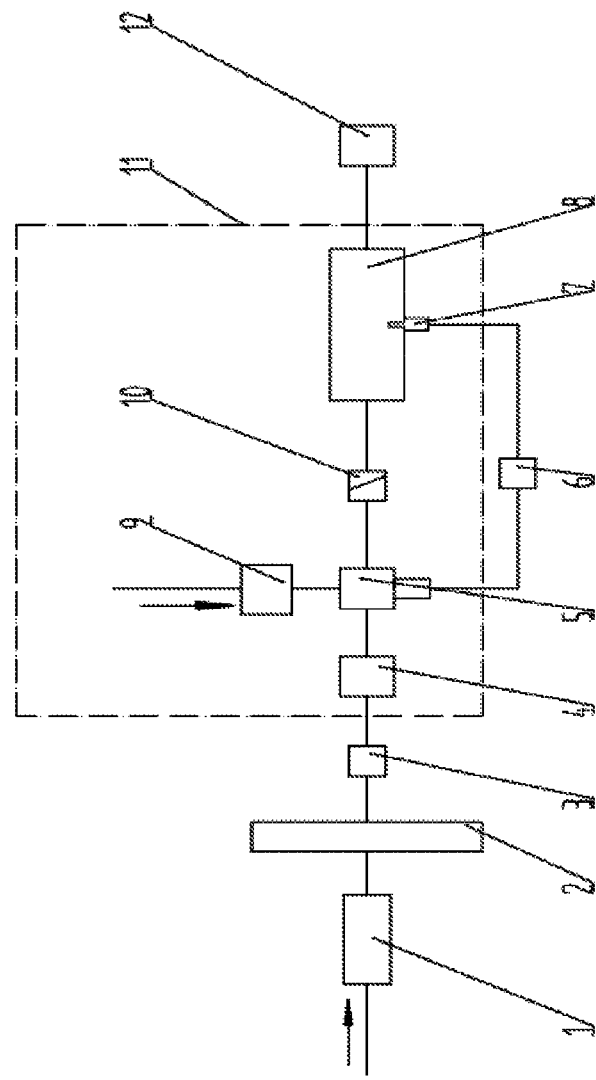
FIG. 1. The schematic diagram of the structure of this invention
Figure 2:
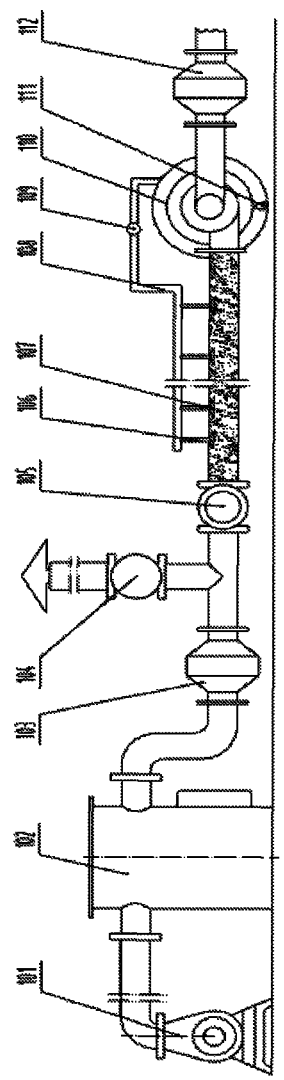
FIG. 2. The schematic diagram of the structure of the fine water mist transmission system.
Figure 6:
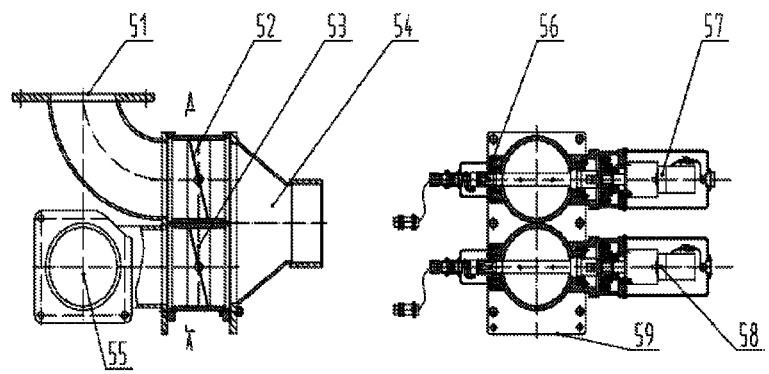
FIG. 6. The schematic diagram of structure of the fuel-air mixer.
Figure 7:
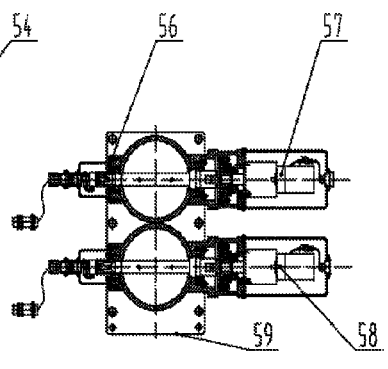
FIG. 7. The schematic diagram of structure in A-A direction of the structure shown in FIG. 6.
Figure 8:
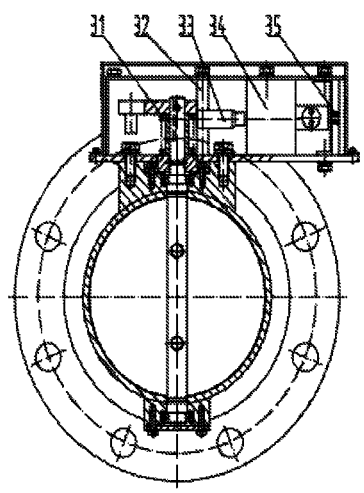
FIG. 8. The schematic diagram of structure of electric butterfly valve as shown in FIG. 1.
Figure 9:
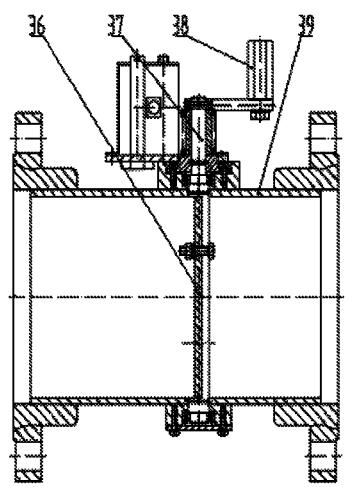
FIG. 9. The side view of the structure shown in FIG. 8.

Seen FIGS. 1 to 9, the said reciprocating generator assembly comprising a engine fueling low-concentration methane (11), an generator (12), a fine water mist transmission system (1), a refrigerating dehydrator (2), an electric butterfly valve (3), a pressure regulator (4), a fuel-air mixer (5), a TEM controller (6), heat load sensors (7), combustion chambers (8), an air filter (9), and a speed governing butterfly valve (10). The fine water mist transmission system is attached in sequence with refrigerating dehydrator (2), electric butterfly valve (3) and low-concentration methane engine (11). The pressure regulator (4), fuel-air mixer (5), air filter (9), speed governing butterfly valves (10), heat load sensor (7) and combustion chamber (8) are installed in the engine (11). The TEM controller (6) is connected to the fuel-air mixer (5) and heat load sensor (7). The generator (12) is connected to the low-concentration methane engine (11).

The combustion chamber (8) applied in the said engine is constructed with a basin-shaped structure. The fuel-air mixer (5) mounted on the engine is connected to the speed governing butterfly valve (10), air filter (9) and pressure regulator (4). Such speed regulating butterfly valve (10) is connected to the combustion chamber (8) of the engine.

The pressure regulator (4) in the engine herein comprises a valve body (45), a built-in valve seat (44), an air valve (43) fixed on the valve seat (44), a pressure regulating level (46) at the top end of the air valve, a regulating shaft (47) that is jointed vertically along the horizontal direction to the pressure regulating level (46), diaphragm (42) and pressure regulating spring (41).

The fuel-air mixer (5) referred herein is built in a housing body (59). On one side of body an air inlet (51) and a methane inlet (55) are arranged. Both inlets (51) and (55) are mounted with sensors (56). An air butterfly disc (52), which is connected with the air stepping motor (57) is mounted with the air inlet (51); and a methane butterfly disc (53) is also mounted in the methane inlet (55). A stepping motor (58) for low-concentration coalmine methane is connected with butterfly disc (53).

The electric butterfly valve (3) herein comprises a butterfly body (39) and a built-in butterfly disc (36). This disc (36) is attached to the driving shaft (37), where a cut-off handle (38) and a torsion spring (31) are housed. On the top of the valve body (39) the thrust pin (32) and plug pin (33), electromagnet (34) and tension spring (35) are mounted in such sequence. The thrust pin (32) is installed horizontally to the driving shaft (37) and perpendicularly to the plug pin (33). The plug pin (33) is connected to the one side of the electromagnet (34) and the tension spring (35) is connected to other side of the electromagnet (34). The handle (38) is fitted into the driving shaft (37).

The fine water mist transmission system (1) comprises a water-sealing flame arrestor (102), a dry type flame arrestor (103) for methane pipelines, a wet-type methane release valve (104), a low-concentration methane transmission valve (105), a water mist control valve (106), a high-pressure resistance water mist producer (107), high-pressure water transmission pipelines (108), a water mist circulation pump (109), a dehydrator (110), a water drain valve (111) and a terminal dry-type coalmine methane flame arrestor (112), which are mounted in sequence after the vacuum pump (101).

During the operation, as shown in FIG. 1, low-concentration methane is pumped out by the vacuum pump (101) in such order into the fine water mist transmission system (1), refrigerating dehydrator (2), electric butterfly valve (4) and the fuel-air mixer (5). Airflow from the air filter (9) comes into the fuel-air mixer (5). Inside the fuel-air mixer, low-concentration methane mixes with air at certain defined ratio, then, the combustible mixture enters into the combustion chamber (8) in the engine after passing the speed regulating valve (10). Inside the combustion chamber (8), the mixture explores and works regularly. The engine outputs the power through the flywheel (1). Heat load of the low-concentration methane engine governs the ratio of low-concentration methane to air. The heat load sensor (7) transmits signals to TEM controller (6). Based on calculated process, the controller sends out orders to drive the stepping motor in the fuel-air mixer (5) to adjust the passage of fuel or air, and therefore, to set the proper air/fuel ratio.

After being drained out from the underground coalmine by the vacuum pump, the methane passes initially through the water-seal dry flame arrestor (102) located in the well shaft and then flows into the methane transmission pipelines (108). The water level of the flame arrestor (102) is detected by the radar and controlled within the required range to ensure that the drained coalmine methane does not have any potential danger to underground mining production in the coalmines. The methane pipe dry flame arrestor (103), which is mounted before the water mist device, may extinguish fire efficiently in case of back-fire occurs in the water mist transmission system. Because the wet methane release valve (104) is applied, it gets much convenient to do maintenance for the water mist transmission device. If the water mist transmission system is required to replace with new parts, the low-concentration methane transmission valve (105) should be closed, at the same time, the wet methane release valve (104) keeps open. When the low-concentration methane transmission system (1) is in normal operation, the low-concentration methane transmission valve (105) should be open and the wet methane release valve (104) should be closed. The water mist control valve (106) is mounted on the pipelines at several points to adjust and control water mist injection. High-pressure resistance water mist producers (107) are distributed in the system at equal distance for even water mist distribution. Depended on the amount of coalmine methane to be transmitted, pressure resistance water mist producers (107) are relocated at different distance. This device provides a safeguard of coalmine.

Low-concentration methane flows through the right inlet arranged in the pressure regulator valve body (4) and flows out from the left vent arranged in the valve body (45) after passing through the chamber between the valve seat (44) and valve (43). Inlet pressure of the low-concentration methane is determined by adjusting the pressure compensator of spring according to the low-concentration methane engine. The right side of the diaphragm (42) is open to air and its left side senses the low-concentration methane pressure. When methane inlet pressure rises, the outlet pressure rises instantly, as result, the pressure in left side of the diaphragm gets higher against the pressure from adjusting spring (41). The diaphragm (42) moves toward right direction. The pressure adjusting level (46) drives the valve (43) moving downwards causing the passage of low-concentration methane getting smaller so low-concentration methane pressure at outlet is always kept stable. When gas inlet pressure decreases and pressure in left side of diaphragm (42) gets lower, the spring (41) moves toward the left side of the diaphragm (42). The pressure regulating level (46) drives the valve (43) to move upwards bringing a larger passage for the low-concentration gas to flow in to keep the pressure stable.

The air stepping motor (57) is connected to the butterfly disc (52) in the air inlet (51). The stepping motor (58) for low-concentration methane is connected to butterfly disc (53) in the low-concentration methane inlet (55). Air passes into fuel-air mixer (5) through the air inlet (51) and the low-concentration methane flows into the fuel-air mixer (5) through low-concentration inlet (55). Air and methane mixes inside the internal cavity (54) of the fuel-air mixer (5) at certain ratio. The ratio is adjusted by stepping motors (57) and (58) to control opening of butterfly discs (52) and (53). The combustible mixture flows out of the fuel-air mixer to the combustion chambers of the engine.

When it is connected with electricity, the butterfly valve (3) will be opened by turning the handle (38) against the spring force from torsion spring (31). At the same time, the electromagnet force from electromagnet (34) acts against the force from the spring (35). The plug pin (33) is inserted into the thrust pin (32). When engine (11) stops or when exterior power is off, the electromagnet (34) looses its electromagnetic force. The pull spring (35) will move the plug pin (33) back. Under the force of torsion spring (31), butterfly disc (36) closes the electric butterfly valve (3).

We claim:

1. A reciprocating, low-concentration methane generator assembly, comprising: an engine that burns low-concentration methane; a generator; a water mist transmission system; a refrigerating dehydrator; an electric butterfly valve; a pressure regulator; a fuel-air mixer; a TEM controller; a heat load sensor; a combustion chamber of the engine; an air filter; and a speed governing butterfly valve, wherein the fine water mist transmission system is attached in sequence with: the refrigerating dehydrator; the electric butterfly valve; and the low-concentration methane engine, wherein, the pressure regulator, the fuel-air mixer, the air filter, the speed governing butterfly valve, the heat load sensor, and the combustion chamber are installed in the low-concentration methane engine, wherein, the TEM controller is wired to the fuel-air mixer and the heat load sensor, and wherein, the generator is connected to the low-concentration methane engine.

2. The reciprocating, low-concentration methane generator assembly of claim 1, wherein the fuel-air mixer mounted on the low-concentration methane generator assembly is connected to: the speed governing butterfly valve; the air filter; and the pressure regulator, wherein the speed regulating butterfly valve is connected to the combustion chamber of the methane engine.

* * * * *